United States Patent [19]
Lory et al.

[11] Patent Number: 4,912,477
[45] Date of Patent: Mar. 27, 1990

[54] RADAR SYSTEM FOR DETERMINING ANGULAR POSITION UTILIZING A LINEAR PHASED ARRAY ANTENNA

[75] Inventors: John Lory, Smithtown; Kenneth D. Benz, Nesconset, both of N.Y.

[73] Assignee: Grumman Aerospace Corporation, Bethpage, N.Y.

[21] Appl. No.: 273,245

[22] Filed: Nov. 18, 1988

[51] Int. Cl.$^4$ .......................... H01Q 3/22; H01Q 3/24; H01Q 3/26
[52] U.S. Cl. .................................. 342/373; 343/708; 342/372; 342/427
[58] Field of Search ............... 342/372, 373, 427, 153, 342/154; 343/708

[56] References Cited
U.S. PATENT DOCUMENTS 4,176,359 11/1979 Fassett et al. .
4,186,400 1/1980 Cermignani et al. ............... 343/708

Primary Examiner—Theodore M. Blum
Attorney, Agent, or Firm—Scully, Scott, Murphy & Presser

[57] ABSTRACT

An angular position determining system utilizing an electronically scanned, linear phased array antenna radar system. The teachings of the present invention are applicable to airborne, ground or sea based radar systems for determining either elevation of azimuth. In one disclosed embodiment mounted in an aircraft for determining elevation, the linear phased array antenna is formed by a conformal wing array of radiating and receiving elements, wherein the phase front of the antenna beam can be controlled to steer the antenna beam by individually controlling the gain and phase excitation of each radiating element. The array comprises a left portion of the array and a right portion of the array, and each of the left and right portions is formed by a first plurality of elements tilted downwardly in elevation and a second plurality of elements tilted upwardly in elevation. The output signals from the left upwardly tilted plurality of elements are summed to form an up left sum signal, and the output signals from the left downwardly tilted plurality of elements are summed to form a down left sum signal. Similarly, the output signals from the right upwardly tilted plurality of elements are summed to form an up right sum signal, and the output signals from the right downwardly tilted plurality of elements are summed to form a down right sum signal. Additionally, the up left sum signal and the up right sum signal are summed to form a composite up sum signal and the down left sum signal and the down right sum signal are summed to form a composite down sum signal. Finally, the difference is taken between the composite up sum signal and the composite down sum signal to form a delta elevation signal representing the measured elevation output of the system.

7 Claims, 2 Drawing Sheets

RADAR SYSTEM FOR DETERMINING ANGULAR POSITION UTILIZING A LINEAR PHASED ARRAY ANTENNA

BACKGROUND OF THE INVENTION

1. Field of the Invention

The present invention relates generally to a system for determining the angular position of a radar target by using an electronically scanned, linear phased array radar antenna system, and more particularly pertains to an elevation determining system as described designed to utilize a conformal radar antenna mounted in an aircraft and formed by a linear array of endfire elements.

The subject invention is described and illustrated herein with respect to a particular embodiment of an airborne radar system on an aircraft for determining the elevation of a radar target with respect to the aircraft. However, the teachings of the present invention are also applicable to embodiments of ground or sea based radar systems for determining the elevation of an airborne target, and to embodiments for determining the azimuth of a radar target with respect to the radar system.

2. Discussion of the Prior Art

Ganz, et al. U.S. Pat. No. 4,336,543 discloses an electronically scanned antenna system having a linear array of endfire elements of the general type for which the elevation determining system of the present invention was developed. In this antenna system, the endfire elements are laterally spaced between about 0.32 λ to 0.92 λ apart, preferably about 0.552 λ apart, to enhance the effects of mutual coupling therebetween for broadening the radiation signal pattern of the elements in the plane of the array. The endfire elements may be of the Yagi type with each endfire element including a common reflector, a driver, and a plurality of directors. This provides an antenna array of very small vertical dimension so as to be suitable for conformal installation on or within the airfoil surfaces of an aircraft, e.g., wing leading edges and the horizontal stabilizer trailing edge. Such a phased array antenna system can offer surveillance and missile guidance capabilities with high levels of jam resistance at reduced weight, power and volume.

As is known in the art, in an electronically scanned antenna having an array of transmit/receive elements, electronic scanning entails adjustment in the phase excitation coefficients of the elements in the array in accordance with the direction in which the formation of the transmitted beam is desired. It is well known that the beam of an antenna points in a direction that is normal to its phase front. In phased array antennas, the phase front is adjusted to steer the beam by individual control of the phase excitation of each radiating element, which is known in the art as antenna feed. Phase shifters are electronically actuated to permit rapid scanning and are adjusted in phase to a value between 0 and 2 $\pi$ radians.

One important function of many radar systems is the accurate determination of target position. Target position information is essential in such diverse applications as air-traffic control, antiaircraft artillery direction, missile guidance, and satellite tracking. Target azimuth and elevation may be determined by using conventional scanning antennas and appropriate scanning formats. However, when accurate target position and motion information is desired, special radars called tracking radars are often used. Some of the more common tracking radar systems use conical scan, sequential lobing, or phase or amplitude monopulse techniques to sense target position. Each of these techniques involves the use of information obtained from offset antennas or antenna beams to develop signals related to the angular errors between the target position and the boresight axis of the tracking antenna.

The use of monopulse signal processing techniques is a significant feature of the present invention. In such radar systems, information on target direction is obtained from two simultaneous overlapping beam patterns. From these two patterns, sum and difference patterns are generated. The difference pattern is formed by subtracting the received voltage in the first pattern from that of the second pattern, and the sum pattern is formed by adding the received voltages in the first and second patterns. In a simplified monopulse radar system for tracking in one angular coordinate, the signal is transmitted through two apertures by a hybrid junction, and the two received signals are fed to a "magic tee" or similar junction that forms the sum (S) and difference (D) signals, which are then amplified in two identical channels. The difference signal indicates the magnitude of the error, but the error direction is ambiguous. The ambiguity is resolved by comparing the phase of the difference signal with the phase of the sum signal.

SUMMARY OF THE INVENTION

Accordingly, it is a primary object of the present invention to provide an angular position determining system utilizing an electronically scanned, linear phased array antenna radar system.

The subject invention is described and illustrated with respect to a preferred embodiment of an airborne radar system on an aircraft for determining the elevation of a radar target with respect to the aircraft. However, the teachings of the present invention are also applicable to embodiments of ground or sea based radar systems for determining the elevation of an airborne target, and to embodiments for determining the azimuth of a radar target with respect to the radar system, as described in greater detail hereinbelow.

In accordance with the teachings of a preferred embodiment, the present invention provides an angular position determining system utilizing an electronically scanned, linear phased array antenna radar system formed by a linear array of radiating and receiving elements, wherein the phase front of the antenna beam is controlled to steer the antenna beam by individually controlling the phase excitation of each radiating element. The array comprises a left array portion and a right array portion, and each of the left and right array portions is formed by a first plurality of elements pointing in a first direction and a second plurality of elements pointing in a second direction, with the first and second directions being angularly displaced with respect to each other. In the context of an airborne elevation determining radar system, the first plurality of elements are tilted downwardly in elevation (first direction), and the second plurality of elements are tilted upwardly in elevation (second direction).

In the airborne elevation determining radar system, the output signals from the left upwardly tilted plurality of elements are summed to form an up left sum signal, and the output signals from the left downwardly tilted plurality of elements are summed to form a down left sum signal. Similarly, the output signals from the right upwardly tilted plurality of elements are summed to form an up right sum signal, and the output signals from the right downwardly tilted plurality of elements are summed to form a down right sum signal.

Additionally, the up left sum signal and the up right sum signal are summed to form a composite up sum signal, and the down left sum signal and the down right sum signal are summed to form a composite down sum signal. Finally, the difference is taken between the composite up sum signal and the composite down sum signal to form a delta elevation signal representing the measured elevation output of the system.

In greater detail, each radiating and receiving element comprises an endfire element having a maximum gain along the longitudinal axis of that element. The endfire element can be a Yagi element, or could be a dielectric rod or a helix, or any other suitable type. The choice of the type of element depends upon frequency, space, power handling, etc. Moreover, in a preferred embodiment, the electronically scanned, linear phased array antenna radar system is implemented in an aircraft wherein the left and right arrays of elements are part of a single conformal array positioned in the leading edge of the wing of the aircraft which could be either the left or right wing. Moreover, the single conformal array preferably comprises alternately positioned downwardly tilted elements and upwardly tilted elements.

Additionally, in the signal processing, the sum is also taken of the composite up sum signal and the composite down sum signal to form a sum of sums signal which can be used for radar ranging measurements. Moreover, the difference is also taken between the up left sum signal and the up right sum signal to form a composite up difference signal, and the difference is also taken between the down left sum signal and the down right sum signal to form a composite down difference signal. Finally, the composite up difference signal and the composite down difference signal are summed to form a delta azimuth signal. In the context of the airborne elevation determining system, which might have a conformal antenna array on each of the left and right wings, the signal processing as described hereinabove can be performed independently for each wing array. If this were not done independently, an interference pattern (multiple lobes) would result due to the large (electrically) separation between the wings. The reason for implementing the array in each wing is to prevent shadowing by the fuselage, i.e., blocking the beam from the right wing when the beam is scanned to the left and vice versa.

BRIEF DESCRIPTION OF THE DRAWINGS

The foregoing objects and advantages of the present invention for an angular position determining system utilizing a linear phased array antenna may be more readily understood by one skilled in the art with reference being had to the following detailed description of several preferred embodiments thereof, taken in conjunction with the accompanying drawings wherein like elements are designated by identical reference numerals throughout the several views, and in which.

DETAILED DESCRIPTION OF THE DRAWINGS

Figure 1:
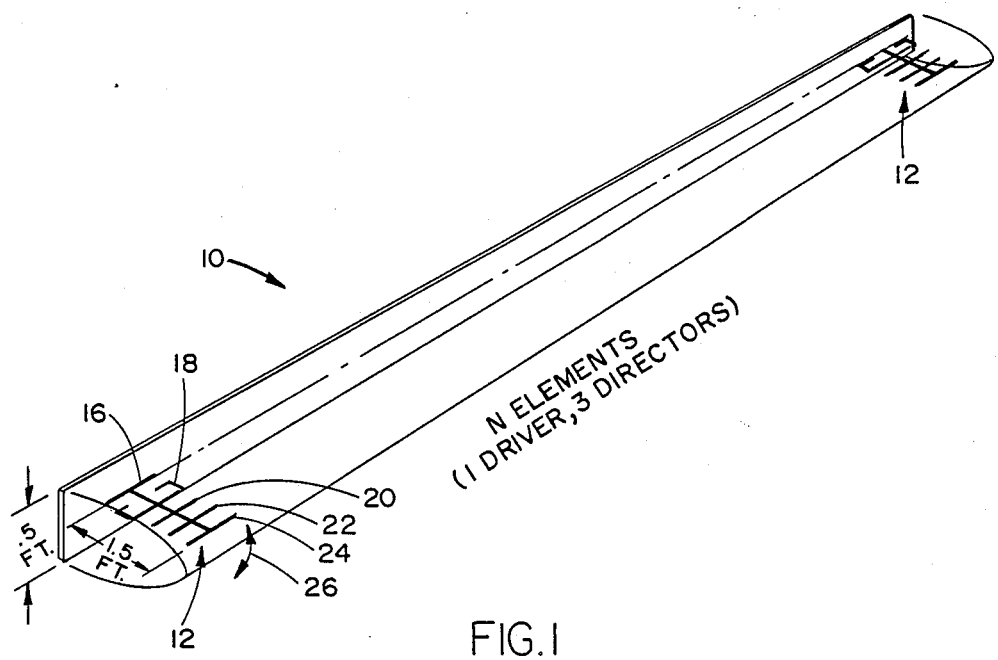
FIG. 1 illustrates a frontal perspective view of an aircraft wing conformal radar array of n transmit/receive modular elements.
Figure 2:
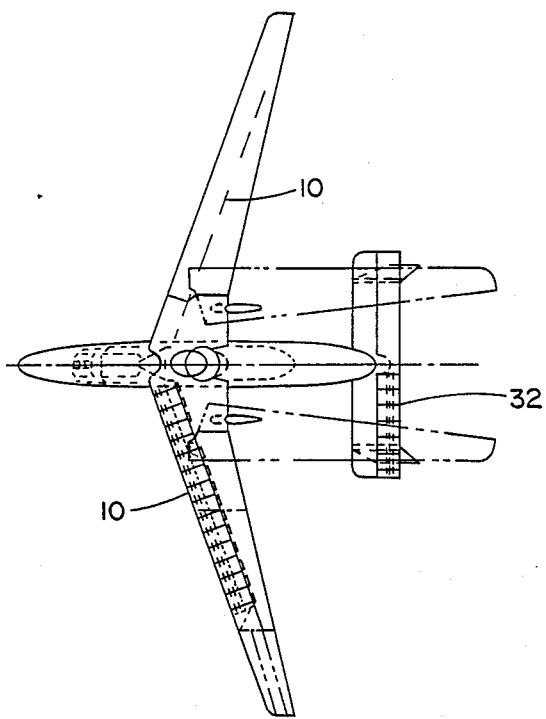
FIG. 2 is a top planar view of an aircraft having a conformal antenna array positioned in each of the wing leading edges, and also in the horizontal stabilizer thereof.

Referring to the drawings in detail, FIG. 1 illustrates a frontal perspective view of an aircraft wing conformal radar array 10 of n transmit/receive modular elements 12 (two of which is shown). FIG. 1 illustrates a typical conformal phased linear array for an aircraft wing, such as is illustrated in FIG. 2. The array is formed of n endfire elements, which can be any type of endfire element, such as a Yagi element or otherwise. For purposes of illustration, a Yagi endfire element 12 includes at least two parasitic elements in addition to the driven element. The particular Yagi endfire element 12 illustrated in FIG. 1 includes five conductive elements 16, 18, 20, 22 and 24. Each element has a diameter of approximately 0.01 $\lambda$ and a length of approximately 0.5 $\lambda$.

The five elements 16, 18, 20, 22 and 24 are positioned in spaced parallel relationship along the same line of sight (transverse axis) with the spacing between the adjacent elements being approximately 0.25 $\lambda$. The five elements 16, 18, 20, 22 and 24 can be supported on a pair of nonconductive Plexiglass supports which electrically insulate the elements 16, 18, 20, 22 and 24 from one another, and advantageously are substantially invisible to the resulting electromagnetic waves.

Element 16 is the reflector element, element 18 is the driven element, and elements 20, 22 and 24 the director elements. A coaxial cable is electrically coupled to the driven element 18 for providing an electrical signal thereto. The reflector 16 and directors 20-24 interact in a conventional manner to provide increased gain and unidirectivity to the radiated signal pattern.

The array element 12 can be mounted substantially horizontally as illustrated in FIG. 1 or can be mounted tilted upwardly or downwardly in elevation, as illustrated generally by arrow 26. However, the antenna is mounted conformal to the aircraft wing, and therefore the tilt angle of each array element 12 is limited and constrained by the thickness of the wing, which depends upon the particular aircraft in which the radar system is mounted.

FIG. 2 is a top plan view of an aircraft 30 having a conformal antenna array 10 positioned in each of its left and right wing leading edges, and also in the horizontal stabilizer 32 thereof. With this arrangement, 360° azimuthal coverage can be obtained by electronically scanning the arrays and conventional side-looking antennas mounted on opposite sides of the fuselage. Advantageously, such an arrangement avoids the need for a large dome mounted on the fuselage which is normally mechanically rotated to provide the same 360° azimuthal coverage.

The embodiment described hereinabove relates to an elevation or height determining system using an electronically scanned, linear phased array antenna radar system as described hereinabove. Basically, the directional properties of the relatively high gain radiating elements are utilized to obtain a monopulse pattern in elevation. In a preferred embodiment, alternate Yagi array elements 12 are tilted UP and DOWN, respectively, as illustrated schematically at the top of FIG. 3. Either the left or right wing antenna array could be utilized, and in the schematic illustration, each wing antenna array includes sixteen Yagi array elements 12. In the left portion of the array, the outputs from the four UP elements are combined in an UP SUM LEFT summing network 40, and the outputs from the four DOWN elements are combined in a DOWN SUM LEFT summing network 42. Likewise, in the right portion of the array, the outputs from the four UP elements are combined in an UP SUM RIGHT summing network 44, and the outputs from the four DOWN elements are combined in a DOWN SUM RIGHT summing network 46.

The outputs of the feed networks 40, 42, 44 and 46 are then processed as in a phase monopulse radar system. The output of the DOWN SUM LEFT network 42 and the output of the DOWN SUM RIGHT network 46 are combined in a hybrid network 48 to obtain a sum signal S and a difference signal D. Likewise the output of the UP SUM LEFT network 40 and the output of the UP SUM RIGHT network 44 are combined in a hybrid network 50 to obtain a sum signal S and a difference signal D.

The two sum signals from the hybrid networks 48 and 50 are then further combined in a 180° hybrid network 52 to obtain a sum signal $\Sigma$ SUM, which can be used for radar ranging measurements, and a difference signal $\Delta EL$, representing the measured elevation output of the system. Likewise, the two difference signals from the hybrid networks 48 and 50 are further combined in a 180° hybrid network 54 to obtain a sum of the difference signals $\Delta AZ$ representing a monopulse delta azimuth signal, and a difference of the difference signals, which is terminated (due to the finite isolation of the hybrid and circuit unbalances).

Figure 3:
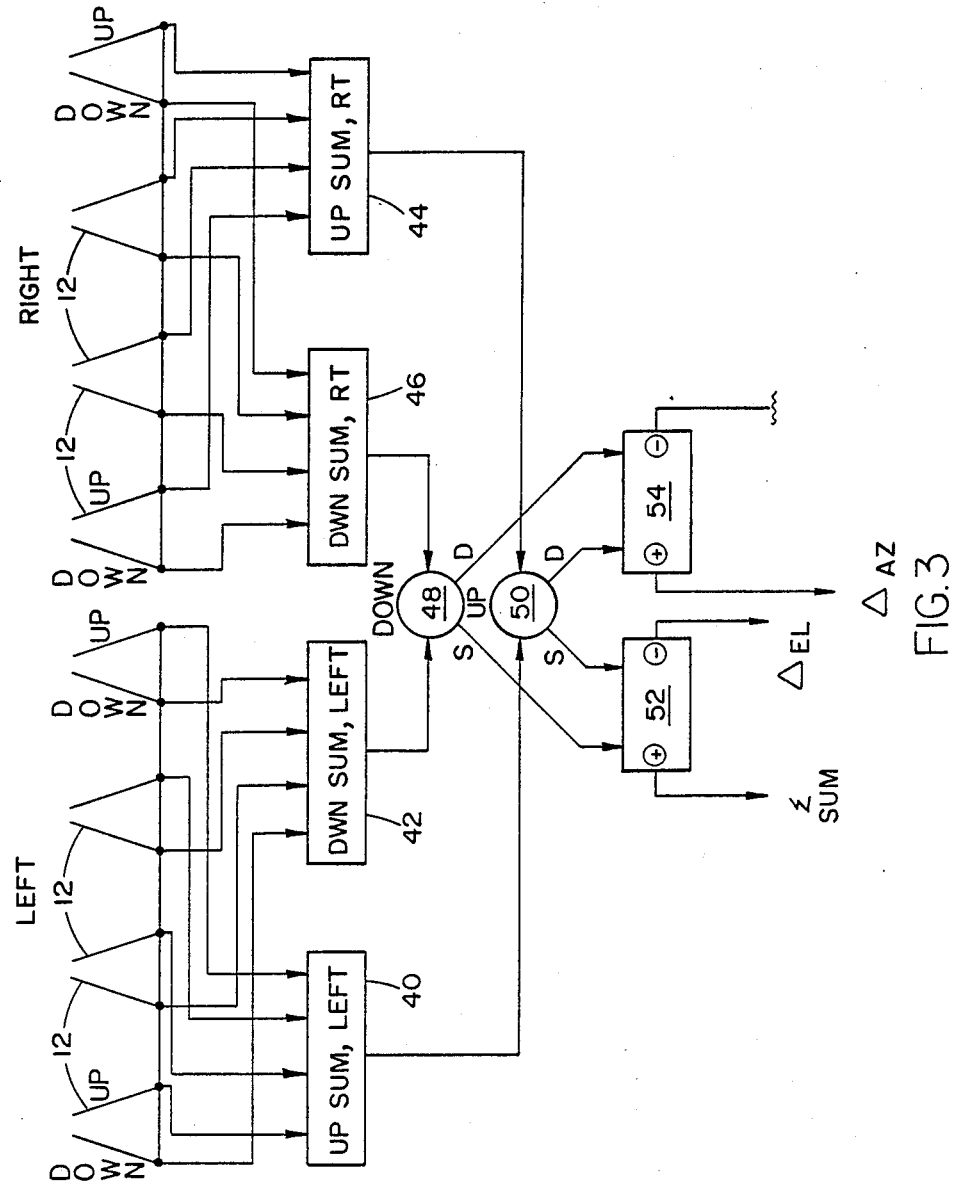
FIG. 3 illustrates a preferred embodiment of an elevation determining system pursuant to the teachings of the present invention which utilizes a linear phased array radar system.

In summary, the outputs of the UP and DOWN Yagi elements are combined in feed networks, and processed as in a phase monopulse radar system to derive a sum and two delta signals. As shown in FIG. 3, the array of Yagi elements is divided into four clusters, and the UP and DOWN elements are combined in left and right summing networks. The sum and difference of the combined UP and DOWN elements are generated in the 180° hybrids 48 and 50. The sum outputs from these two hybrids are the inputs to hybrid 52, where the sum and difference outputs respectively are the monopulse sum and elevation difference signals. The difference outputs from hybrids 48 and 50 are combined in hybrid number 54, where the sum output is the monopulse azimuth signal, and the difference output is terminated.

As indicated hereinabove, the array element 12 elevational tilt angles are constrained by the wing thickness, and hence the separation between the tips of the UP and DOWN tilted elements is limited. However the effective elevation aperture is a function not only of the tilt angle, but also of the location of the phase centers of the tilted elements. The closer to the tips of the Yagi's the phase centers are, the greater will be the effective elevation aperture. The phase center locations can and should be measured as they will be different for an isolated Yagi than for Yagi's in an array environment.

All of the components and elements herein can be, and preferably are, standard commercial components, such as the summing feed networks 40, 42, 44 and 46, and the hybrid networks 48, 50, 52 and 54, and could be, for instance, wave guides, strip lines, or coaxial cables.

In a comparative analysis, the performance of the tilted element array of the present invention was compared to that of a two row array with the spacing between the two rows equal to the separation between the tips of the tilted elements, and the number of elements in each row equal to that of the tilted element array. To achieve a proper normalization, it was assumed that both arrays transmit equal power, but that on receive the SNR of the two row array is 3 dB higher. The primary advantage of the titled element array over the two row array lies in the fact that the elevation monopulse capability is achieved without major additional components (except the two hybrids 52 and 54) beyond those already present in aircraft already having an electronically scanned radar antenna system in the wings thereof as shown in FIG. 2. In contrast therewith, at a minimum, a two row array would require twice the number of radiating elements, low noise amplifiers behind the elements of the second row, and the feed networks for the additional elements. The advantage of the two row array is that the SNR is approximately 3 dB higher, and hence it would also have improved range and angular performance.

In the comparative analysis, the antenna patterns and angular accuracies of the two arrays were also compared, based on the assumption that the tilted element phase centers are at the element tips. The pattern calculations neglected mutual coupling effects between elements, and because of the wide (90 degrees) E-plane element (azimuth) beam beamwidths, only the azimuth array factors were calculated. In the H-plane the element patterns were assumed to be tilted with 70° half power beamwidths. Principal plane azimuth and elevation patterns for broadside and scanned beams were plotted. Elevation patterns for broadside and scanned beam positions outside of the principal planes were also plotted. The azimuth sum and difference patterns of the two arrays are virtually the same. The tilted array sum pattern peak is approximately 0.15 dB lower due to the element tilts. As in any phased array, the scanned beams are unsymmetrical in the scan plane, and hence the boresight shifts with scan angle. In elevation, the major difference is the higher modulation slope of the two row array due to the larger (twice) the number of elements. In the principal planes the elevation difference patterns of the two arrays are essentially the same shape. The elevation null positions of the two row array do not vary in the principal plane or planes parallel to the principal plane. The tilted element array elevation null positions vary in planes parallel to the principal plane. This effect is due to the phase centers (in the azimuth plane) of the UP and DOWN tilted subarrays being displaced about the boresight axis. This boresight shift may be resolved by a limited azimuth scan, since the maximum signal return occurs when the target lies in the principal plane. The elevation modulation slope of the tilted array varies (with beam scan angle) between 0.143 volts/degree and 0.187 volts/degree, respectively, for a broadside beam and a beam scanned approximately 55° off axis. At 50 percent (150 nm) maximum range, the angular uncertainty (for s=0.143 volts/degree) equals ±0.62 degrees, leading to a target height uncertainty of ±4.7 Kft; at a maximum radar range this increase to ±18.8 Kft. and ±9.8 Kft.

The embodiment described hereinabove relates specifically to an airborne radar system on an aircraft for determining the elevation of a radar target with respect to the aircraft. However, the teachings herein are also applicable to embodiments of ground or sea based radar systems for determining the elevation of an airborne target. The ground or sea based elevation determining embodiments would also employ a substantially horizontally mounted linear phased array antenna mounted on a ground base or in a seacraft, and the signal processing would be substantially the same as that described hereinabove.

The teachings of the present invention are also applicable to azimuth determining systems in which the linear phased array antenna would be mounted in a substantially vertical position. In these embodiments, the left and right portions of the antenna array would translate as upper and lower portions, and the signal processing would again be substantially the same as that described hereinabove, and the output therefrom would be indicative of azimuth rather than elevation.

While several embodiments and variations of the present invention for an angular position determining system utilizing a linear phased array antenna are described in detail herein, it should be apparent that the disclosure and teachings of the present invention will suggest many alternative designs to those skilled in the art. However, in alternative embodiments, the clusters of up and down (or right and left) elements may be arranged in different configurations and orders, and furthermore the number of and the particular design of the transmit/receive elements could be varied in different embodiments, generally in dependence upon the design objectives of the system and other practical considerations.

What is claimed is:

1. A system for determining angular position utilizing an electronically scanned, linear phased array antenna radar system, comprising:
   a. an electronically scanned, linear phased array antenna comprising an array of radiating and receiving elements positioned along an array axis, wherein the phase front of the antenna beam can be controlled to steer the antenna beam by individually controlling the phase excitation of each radiating element, said array of elements comprising a left portion of the array having a first plurality of elements pointing in a first direction, and a second plurality of elements pointing a second direction angularly displaced with respect to said first direction, and further comprising a right portion of the array having a first plurality of elements pointing in said first direction, and a second plurality of elements pointing in said second direction;
   b. means for summing the output signals from the left second direction pointing plurality of elements to form a second direction left sum signal, and means for summing the output signals from the left first direction pointing plurality of elements to form a first direction left sum signal;
   c. means for summing the output signals from the right second direction pointing plurality of elements to form a second direction right sum signal, and means for summing the output signals from the right first direction pointing plurality of elements to form a first direction right sum signal;
   d. means for summing the second direction left sum signal and the second direction right sum signal to form a composite second direction sum signal, and means for summing the first direction left signal and the first direction right sum signal to form a composite first direction sum signal; and
   e. means for taking the difference between the composite second direction sum signal and the composite first direction sum signal to form a delta angular position signal representing the measured angular position output of the system.

2. A system for determining angular position utilizing an electronically scanned, linear phased array antenna radar system, as claimed in claim 1, each radiating and receiving element comprising an endfire element having a maximum gain along the longitudinal axis of that element.

3. A system for determining angular position utilizing an electronically scanned, linear phased array antenna radar system, as claimed in claim 1, mounted in an aircraft for determining the elevation of a radar target with respect to the aircraft, wherein said linear phased array antenna is mounted with the array longitudinal axis in a substantially horizontal position, said first direction is a downwardly pointing direction and said second direction is an upwardly pointing direction.

4. An elevation determining system utilizing an electronically scanned, linear phased array antenna radar system, as claimed in claim 3, wherein said left and right portions of the array comprise a single conformal array positioned in the leading edge of the wing of the aircraft.

5. An elevation determining system utilizing an electronically scanned, linear phased array antenna radar system, as claimed in claim 4, said plurality of elements in the left portion of the array comprising alternately positioned downwardly pointing elements and upwardly pointing elements, and said plurality of elements in the right portion of the array comprising alternately positioned downwardly pointing elements and upwardly pointed elements.

6. A system for determining angular position utilizing an electronically scanned, linear phased array antenna radar system, as claimed in claim 1, said means for taking the difference also taking the sum of the composite second direction signal and the composite first direction signal to form a sum of the sum signals which can be used for radar ranging measurements.

7. An elevation determining system utilizing an electronically scanned, linear phased array antenna radar system, as claimed in claim 3:
   a. said means for forming the composite second direction sum signal also taking the difference between the second direction left sum signal and the second direction right sum signal to form a composite second direction difference signal;
   b. said means for forming the composite first direction sum signal also taking the difference between the first direction left sum signal and the first direction right sum signal to form a composite first direction difference signal; and
   c. means for summing the composite second direction difference signal and the composite first direction difference signal to form a delta azimuth signal.

* * * * *